United States Patent [19]
Antoniou et al.

[11] Patent Number: 5,273,659
[45] Date of Patent: Dec. 28, 1993

[54] PROCESS OF RECOVERING A SOLID COMPONENT FROM A SOLID COMPOSITION BY CLARIFICATION AND EXTRACTION

[75] Inventors: Chris Antoniou, Andover; Gastón de los Reyes, Framingham, both of Mass.; Eric Rudolph, Ambler, Pa.

[73] Assignee: Millipore Corporation, Bedford, Mass.

[21] Appl. No.: 726,598

[22] Filed: Jul. 8, 1991

[51] Int. Cl.⁵ .............................................. B01D 61/18
[52] U.S. Cl. .................................. 210/651; 210/195.2
[58] Field of Search ...................... 210/651, 195.2, 773; 435/867, 169

[56] References Cited

U.S. PATENT DOCUMENTS 4,230,692 10/1980 Sehgal et al. ................... 435/169 X
4,618,584 10/1986 Johnson et al. .................. 210/651 X

OTHER PUBLICATIONS

Michaels, "New Separation Technique for the CPI", from Chem. Eng. Progress, Dec. 1968, pp. 31–43.

Primary Examiner—Frank Spear
Attorney, Agent, or Firm—Paul J. Cook; Andrew T. Karnakis

[57] ABSTRACT

A solid component of a solid composition admixed with an aqueous medium is recovered by clarification and extraction in a common apparatus. An organic solvent for the solid component is admixed with the solid composition in the presence of the aqueous medium and the organic solvent is clarified in the apparatus by filtration with a filter which is not degraded by the organic solvent.

28 Claims, 2 Drawing Sheets

PROCESS OF RECOVERING A SOLID COMPONENT FROM A SOLID COMPOSITION BY CLARIFICATION AND EXTRACTION

BACKGROUND OF THE INVENTION

This invention relates to a process for separating aqueous insoluble, organic solvent-soluble solid components from solid compositions. More particularly, this invention relates to such a process wherein organic solvent-soluble solid components can be isolated from a solid composition by clarification and extraction conducted in the same apparatus.

At the present time a wide variety of solid compositions are treated to recover a solid component of the composition which is either a useful product or which renders the remaining solid composition a useful or safely disposable product. Such solid compositions include the solid portion of fermentation broths wherein the desired product comprises the solid component to be recovered, the solid portion of animal or plant tissue which comprises the solid compound to be recovered or solid toxins in solid wastes which are desired to be removed so as to render the remainder of the solid waste useful or in a form which permits its safe disposal.

At the present time, the solid biomass portion of a fermentation broth containing the desired water insoluble solid component is filtered and then redispersed by a multiple batch process in an organic solvent which selectively solubilizes the desired solid component. By utilizing a plurality of redispersion and filtration steps, the desired solid component can be effectively removed from the remaining solid biomass. The resultant dissolved solid component is recovered by conventional means such as by extraction, evaporation or with a water miscible solvent which is subsequently mixed with water to precipitate the desired solid component. Alternatively, the whole fermentation broth is admixed with a water-immiscible organic solvent. The resulting mixture is allowed to separate into two phases and the organic phase is decanted. Subsequently the desired product is recovered by precipitation and/or extraction. Alternatively, the whole fermentation broth is admixed with an organic solvent which is immiscible with water in order to selectively dissolve the desired solid component followed by filtration and reextraction with the water-immiscible organic solvent.

These processes are undesirable since they require multiple independent steps which require transportation of the treated material from step to step. This procedure is expensive and time consuming. In addition, the recovery rate of product is in the order of about 60% which is undesirably low. Furthermore, these processes increase personnel exposure to process fluids and of product to air borne contaminants.

Accordingly, it would be desirable to provide a process for recovering products from solid compositions which products are insoluble in water but soluble in organic solvents which can be effected in one step. In addition, it would be desirable to provide such a process which provides a high yield of uncontaminated product in the order of 90% recovery or higher.

SUMMARY OF THE INVENTION

This invention is based upon the discovery that extraction of a desired solid component from a mixture of an aqueous medium and a solid composition with an organic extraction solvent and clarification of a solution of the solid component can be effected in a common apparatus. In addition the aqueous solid mixtures can be treated prior to extraction in the same apparatus to remove impurities which interfere with the quality of the recovered product or treated to remove water which would interfere with the subsequent extraction step. In a typical process of this invention, an aqueous-solid mixture such as a broth obtained upon completion of fermentation utilizing microorganisms to produce a solid, aqueous-insoluble product is reduced in volume by filtration. In the same apparatus, the solid, aqueous-insoluble Product then is admixed with an organic solvent which selectively solubilizes the desired solid product. Clarification is effected also in the same apparatus with a filter which is not deteriorated by contact with an organic solvent for the desired solid component such as a ceramic filter. The desired solid product then is recovered in purified form from the solution by any conventional means such as by evaporating the solvent. Additional process steps such as washing with aqueous solutions to remove impurities, washing of spent solid composition to remove solvent or extraction with organic, water miscible solvent to remove water to increase product recovery can be utilized in the apparatus where clarification and extraction are carried out.

The process of this invention eliminates the need for multiple process steps to obtain a pure solution of the desired product. In addition, the process of this invention provides a means for obtaining yields of desired purified product which are higher than that obtainable with presently available processes.

DESCRIPTION OF SPECIFIC EMBODIMENTS

Figure 1:
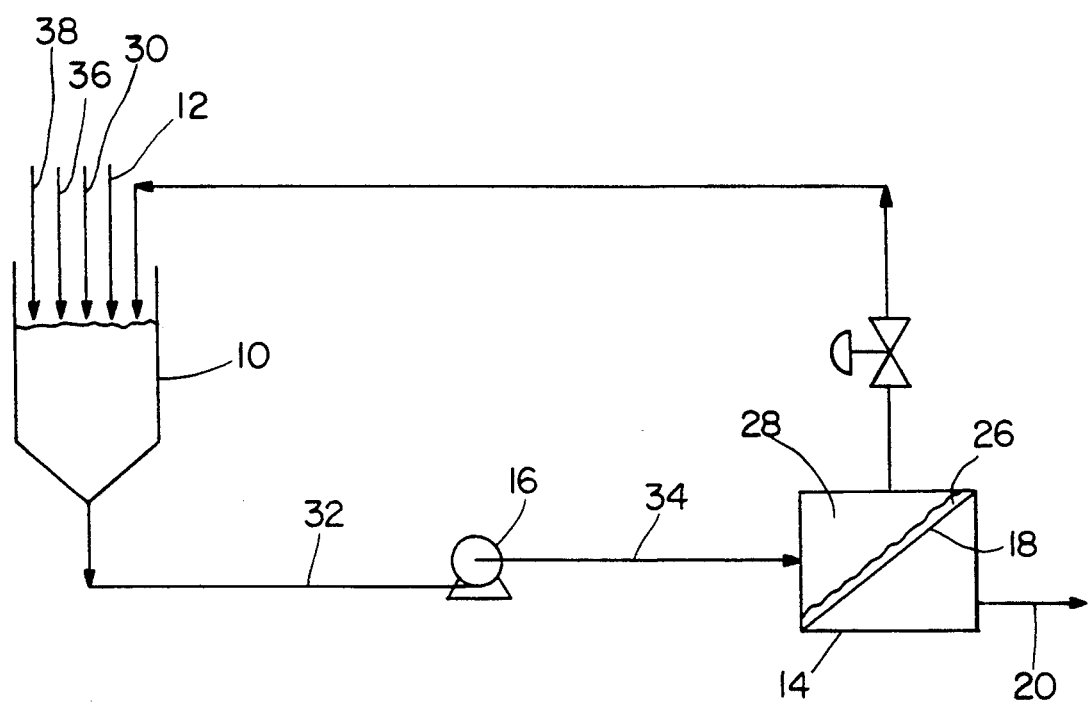
FIG. 1, illustrates a process flow useful in the process of this invention.

In accordance with one embodiment of this invention, a mixture of an aqueous liquid medium and a solid composition containing a desired solid component is concentrated by filtration to remove excess aqueous volume. This preliminary filtration step is not essential to this invention. Filtration is effected by utilizing a filter such as a ceramic or metal or solvent resistant polymeric filter so as to reduce the volume ratio of aqueous liquid to solid to between about 9:1 and 1:1, preferably between about 3:1 and 1:1. This preliminary step is utilized to reduce the volume of liquid which is to be processed subsequently and is particuarly useful when processing fermentation broths.

In the step of this invention which is utilized subsequent to the preliminary filtration step, the concentrated solid composition is mixed with an organic extraction solvent which selectively solubilizes the solid product of interest while the remainder of the solid remains insolubilized. The organic extraction solvent utilized is admixed with the concentrated solid retentate on the filter and the desired product is recovered as permeate dissolved in the organic extraction solvent. The solid remaining on the filter can be either discarded or recycled to admixture with an incoming feed composition. By virtue of the fact that desired solid component in solution is recovered after being passed through the solvent resistant filter, the solution obtained is clarified. This extraction and clarification are achieved in a single step and in a single apparatus which also can be utilized to effect the alternative preliminary filtration step.

In one aspect of the present invention the concentrated solid retentate obtained after the preliminary filtration step can be treated to remove contaminants and/or water in the same apparatus used in effect extraction and clarification. Contaminants are removed by admixing the solid retentate with an aqueous liquid such as water or a buffer and then filtering the resultant mixture. This step can be repeated as often as desired depending upon the nature and the concentration of contaminant present. Water then can be removed from the aqueous solid mixture by admixing it with a water miscible organic cosolvent such as methanol, acetone, n-butanol, ethanol, isopropanol or acetonitrile or mixtures thereof. The water is removed with the water miscible cosolvent as permeate. A primary advantage of the invention is that the filtration and extraction steps as well as the contaminant purification step and the water removal step can be conducted with a single and enclosed apparatus without the need for transporting the solid to be treated.

The process of this invention is particularly useful for treating biomass compositions such as those produced in fermentation process used for the manufacture of antibiotics, vitamins, steroids or the like from microorganisms such as fungi, bacteria or yeast. The antibiotics or steroids are produced or modified by growing the microorganism in a suitable aqueous nutritive environment. As the microorganisms grow, mycelia solid biological materials increase which retards further microorganisms growth. The antibiotic is insoluble in the aqueous nutritive environment and is retained within the microorganism or precipitated as a solid extracellular material. Exemplary antibiotics recovered by the process of this invention include, aureomycin, tetracycline, streptomycin and the like. Exemplary steroids recovered by the process of this invention include progestins, corticoids, estrogens, anabolic hormones or the like.

The filter utilized in the present invention to effect filtration and extraction include ceramic filter such as alumina, zirconia, silicon carbide, silicon nitride, or carbon or the like having an average pore size between about 0.04 and 2 um as well as a metal filter such as Mott metal having an average pore size between about 0.01 and 1 um. In addition, solvent resistant polymeric membranes can be utilized such as those formed from fluoropolymers.

Referring to FIG. 1, a feed composition comprising a solid composition suspended in an aqueous medium is introduced into feed tank 10 through conduit 12. The feed composition, in a first step, generally is pumped by pump 16 from tank 10 to membrane filtration module 14 which utilizes an organic solvent resistant filter 18. Aqueous permeate is removed from filtration module 14 through conduit 20. After the aqueous liquid content of the original solid in the aqueous medium compostion has been reduced, the remaining composition in the retentate 26 of filtration module 14 is treated further in accordance with this invention. Prior to the step of extracting the desired solid component from the original composition, the original composition can be treated to remove water or to remove solid components which interefere with product recovery. When it is desired to remove solid components in the retentate 26 which interfere with product recovery or which contaminates the product, a solvent such as water which is not a solvent for the desired product but which is a solvent for the intereferant or contaminant is introduced through conduit 30 into tank 10, through conduits 32 and 34 and into retentate 26. The dissolved interferant or contaminant is removed as permeate and discarded. When the extraction solvent to solubilize the desired solid component is not water miscible, a water miscible organic solvent is introduced through conduit 36 and into upstream section 28 for admixture with the retentate 26 and to remove water in admixture with the water miscible solvent as permeate. When it is desired to recover the desired product, an organic solvent which selectively solubilizes the desired solid component is introduced through conduit 38 into tank 10 and into admixture with the retentate 26. The product is recovered as a permeate solution through conduit 20. The product is recovered from the solution by any conventional such as by evaporation or extraction with a solvent which is miscible with the product solvent but which does not solubilize the product.

Figure 2:
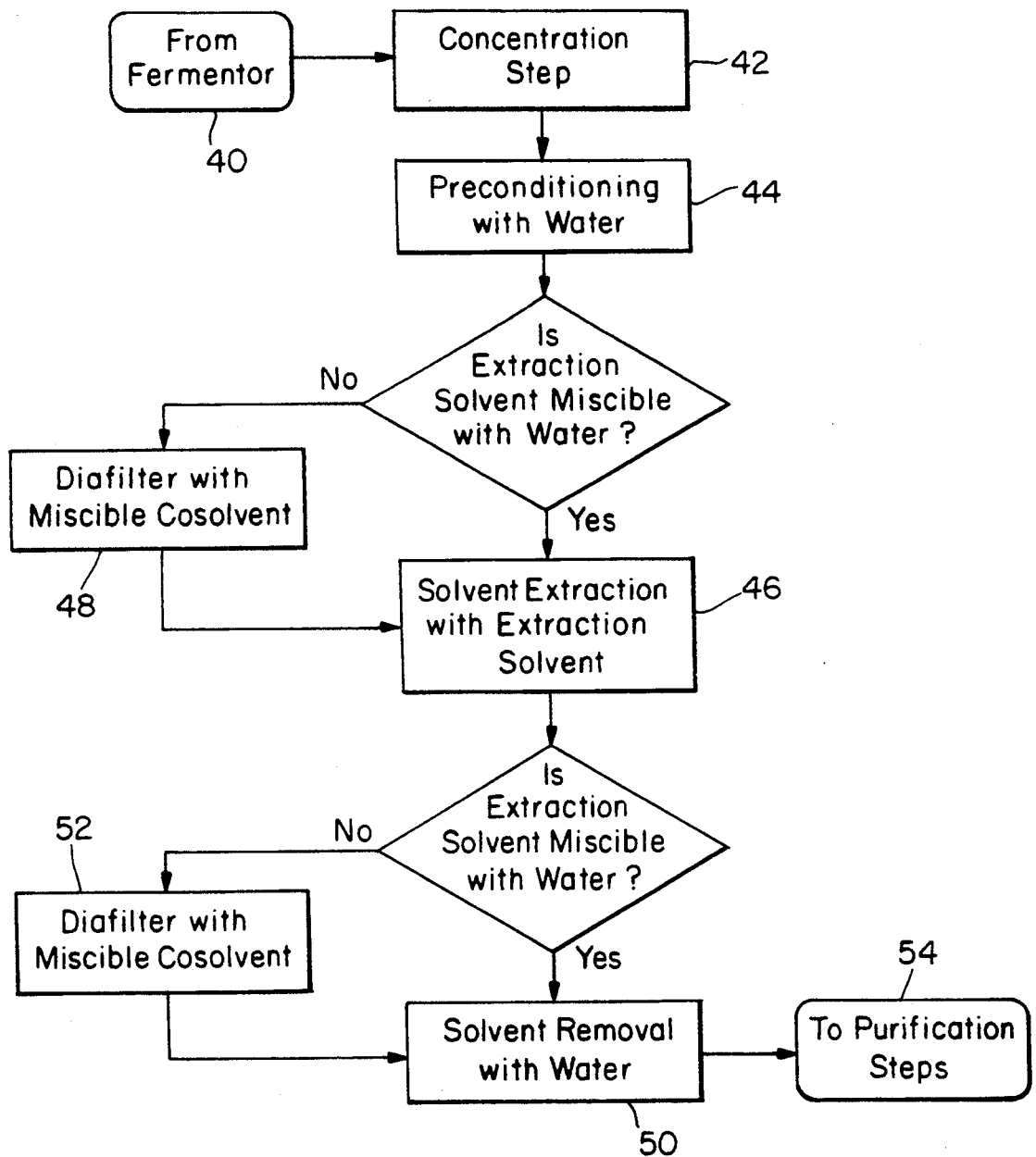
FIG. 2, is a process flow diagram illustrating alternative embodiments of this invention.

Referring to FIG. 2, a process flow diagram is shown which illustrates various embodiments of this invention wherein the solvent for the desired solid component is water miscible or water immissible. a typical mixture of solid composition and aqueous composition is obtained from a fermentator which is directed into the filtration module 14 in order to effect concentration of the solid composition by filtration through the filter 18 in concentration step 42. The solid composition can be mixed with water in one or a plurality of steps 44 in order to remove any water soluble contaminants. The solvent for the solid component to be recovered can be water miscible or water immiscible. When the solvent is water miscible it is admixed with the solid composition in the filtration module 14 in solvent extraction step 46. When the solvent is water immiscible, it is desirable to first admix the water containing solid composition with a cosolvent which is both miscible with water and miscible with the solvent component in step 48. The purpose of this step is to remove water from the extraction step 46, a water miscible solvent for the solid component is removed from the solid composition by extraction with water in step 50. When the solvent for the solid component is water immiscible, the solid composition first is admixed in step 52 with a cosolvent which is miscible with water and with the solvent. The cosolvent functions to remove solvent from the solid composition which, in turn, can be removed with water in step 50. In either event, the solvent containing the desired component is directed to a purification step 54 wherein the solid component is recovered such as by evaporation or the like. In addition, since the final retentate contains water rather than an organic solvent, it can be more easily and safely disposed of. The following example illustrates the present invention and is not intended to limit the same.

EXAMPLE I

This example provides a comparison of the process of this invention and the process of the prior art to illustrate the improved product recovery obtained with the process of this invention.

The methyl glucoside produced is an intercellular antibiotic produced by fermentation with *Micromonosoora carbonacea* bacteria in a nutrient.

Utilizing a process of the prior art, the product was recovered by transferring the fermentation broth to a mixing tank where ethyl acetate was added at a volume ratio or 2 parts ethyl acetate to 1 part broth. The methyl glucoside is extracted from the biomass to the liquid phase which contains water and ethyl acetate.

The solids settled in the mixing tank and the liquid was decanted, transferred to a second tank and this extraction step was repeated two times and the extractants were combined. The methyl glucoside was recovered by filtration and the recovery was 60 percent as measured by HPLC.

Utilizing the process of this invention as illustrated in FIG. 1, an alpha alumina microporous (Ceraflo ™) membrane 18 available from Millipore Corporation and having a 0.2 um porosity was utilized in the filtration module 14. The product treated was the fermentation broth described above. The lumen diameter of the filter element was 6.0 mm. The first concentration step was effected at 77° F. at a pressure of 55 psi and at a feed rate of 16.5 ft/sec. 20 liters of feed composition were filtered to reduce the feed composition volume by 80% 0.4 liters of water were added to the biomass and the filtration was effected 0.2 liters of methanol then was added into the feed tank 70 at 77° F. The permeate was recovered at a rate of 4.5 liter/hr. until 2.5 liters of methanol solution was obtained. 12 liters of methanol/ethyl acetate (1/7) mixture was incorporated into module 10 at 22° F. The permeate was recovered at a rate of 4.5 liter/hr until 12 liters were obtained. The methyl glucoside product recovery was 90% as measured by HPLC.

We claim:

1. The process for recovering a solid component which is insoluble in water from a mixture of an aqueous composition and a solid composition which comprises:
   admixing in a filtration apparatus having a filter which is not degraded by a solvent for said solid component said mixture with a water-miscible organic solvent and which selectively solubilizes said solid component from said solid composition to form a solution of said solid component and
   clarifying said solution of said solid component by selectively passing said solution and water through said filter while retaining nonsolubilized solid.

2. The process for recover component which is insoluble in water from a mixture of an aqueous composition and a solid composition which comprises:
   filtering said mixture to separate at least a portion of said aqueous composition from said solid composition in a filtration apparatus having a filter which is not degraded by a solvent for said solid component,
   admixing in said filtration apparatus said solid composition with a water-miscible organic solvent which selectively solubilizes said solid component from said solid composition to form a solution of said solid component,
   and clarifying said solution of said solid component by selectively passing said solution through said filter while retaining nonsolubilized solid.

3. The process for recovering a solid component which is insoluble in water from a mixture of an aqueous composition and a solid composition which comprises:
   filtering said mixture to separate at least a portion of said aqueous composition from said solid composition in a filtration apparatus having a filter which is not degraded by a solvent for said solid component,
   admixing in said filtration apparatus said solid composition with a first organic solvent which is miscible with water and miscible with a second solvent for said solid component and which does not solubilize said solid component to form a water-first organic solvent solution, said filter not being degraded by said first organic solvent,
   filtering said water-first organic solvent solution through said filter to separate said water-first organic solvent solution for said solid composition,
   admixing in said filtration apparatus said solid composition with said second organic solvent which is immiscible with water, and which selectively solubilizes said solid component from said solid composition to form a solution of said solid component,
   clarifying said solution of said solid component by selectively passing said solution of said solid component through said filter to separate said solution of said solid component while retaining nonsolubilized solid,
   admixing in said filtration apparatus said nonsolubilized solid with a third organic solvent which is miscible with water, which is a cosolvent for said second solvent and which does not solubilize said nonsolubilized solid, said filter not being degraded by said third organic solvent and
   filtering a third organic solvent-second organic solvent solution through said filter.

4. The process of claim 3 wherein said first organic solvent and said third organic solvent are the same solvent.

5. The process for recovering a solid component which is insoluble in water from a mixture of an aqueous composition and a solid composition which comprises:
   filtering said mixture to separate at least a portion of said aqueous composition from said solid composition in a filtration apparatus having a filter which is not degraded by a solvent for said solid component,
   admixing in said filtration apparatus said solid composition with an aqueous solvent for a portion of said solid composition and which is not a solvent for said solid component,
   filtering said aqueous solvent containing said portion of said solid composition through said filter,
   admixing in said filtration apparatus said solid composition with a water-miscible organic solvent which selectively solubilizes said solid component from said solid composition to form a solution of said solid component,
   and clarifying said solution of said solid component by selectively passing said solution of said solid component through said filter while retaining nonsolubilized solid.

6. The process for recovering a solid component which is insoluble in water from a mixture of an aqueous composition and a solid composition which comprises:
   filtering said mixture to separate at least a portion of said aqueous composition from said solid composition in a filtration apparatus having a filter which is not degraded by a solvent from said solid component,
   admixing in said filtration apparatus said solid composition with an aqueous solvent for a portion of said solid composition and which is not a solvent for said solid component,
   filtering said aqueous solvent containing said portion of said solid composition through said filter to separate said solid composition from said aqueous solvent, admixing in said filtration apparatus said solid composition with a first organic solvent which is miscible with water, miscible with a second solvent for said solid component and which does not solubilize said solid component to form a water-first organic solvent solution, said filter not being degraded by said first organic solvent, filtering said water-first organic solvent solution through said filter to separate said water-first organic solvent solution from said solid composition, admixing in said filtration apparatus said solid composition with said second organic solvent which is not miscible with water and which selectively solubilizes said solid component from said solid composition, and clarifying said solution of said solid component by selectively passing said solution of said solid component through said filter to separate said solution of said solid component while retaining a nonsolubilized solid, admixing in said filtration apparatus said nonsolubilized solid with a third organic solvent which is miscible with water, which is a cosolvent for said second solvent and which does not solubilize said nonsolubilized solid, said filter not being degraded by said third solvent, and filtering a third organic solvent—second organic solvent solution through said filter.

7. The process of claim 6 wherein said first solvent and said third solvent are the same solvent.

8. The process of claim 1 wherein said nonsolubilized solid is mixed with an aqueous solvent miscible with said organic solvent and filtering a solution of said aqueous solvent and said organic solvent through said filter.

9. The process of claim 2 wherein said nonsolubilized solid is mixed with an aqueous solvent miscible with said organic solvent and filtering a solution of said aqueous solvent and said organic solvent through said filter.

10. The process of claim 3 wherein said nonsolubilized solid is mixed with an aqueous solvent miscible with said third organic solvent and filtering a solution of said aqueous solvent and said third organic solvent through said filter.

11. The process of claim 10 wherein said third organic solvent is the same solvent as said first organic solvent.

12. The process of claim 5 wherein said nonsolubilized solid is mixed with an aqueous solvent miscible with said organic solvent and filtering, a solution of said aqueous solvent and said organic solvent through said filter.

13. The process of claim 6 wherein said nonsolubilized solid is mixed with an aqueous solvent miscible with said third organic solvent and filtering a solution of said aqueous solvent and said third solvent through said filter.

14. The process of claim 13 wherein said third organic solvent is the same solvent as said first organic solvent.

15. The process of claim 1 wherein said solid composition includes microorganisms and said solid component is an antibiotic.

16. The process of claim 2 wherein said solid composition includes microorganisms and said solid component is an antibiotic.

17. The process of claim 3 wherein said solid composition includes microorganisms and said solid component is an antibiotic.

18. The process of claim 4 wherein said solid composition includes microorganisms and said solid component is an antibiotic.

19. The process of claim 5 wherein said solid composition includes microorganisms and said solid component is an antibiotic.

20. The process of claim 6 wherein said solid composition includes microorganisms and said solid component is an antibiotic.

21. The process of claim 7 wherein said solid composition includes microorganisms and said solid component is an antibiotic.

22. The process of claim 8 wherein said solid composition includes microorganisms and said solid component is an antibiotic.

23. The process of claim 9 wherein said solid composition includes microorganisms and said solid component is an antibiotic.

24. The process of claim 10 wherein said solid composition includes microorganisms and said solid component is an antibiotic.

25. The process of claim 11 wherein said solid composition includes microorganisms and said solid component is an antibiotic.

26. The process of claim 12 wherein said solid composition includes microorganisms and said solid component is an antibiotic.

27. The process of claim 13 wherein said solid composition includes microorganisms and said solid component is an antibiotic.

28. The process of claim 14 wherein said solid composition includes microorganisms and said solid component is an antibiotic.

* * * * *